C. N. EARL,

Assignor to W. SAMSON & A. L. SWETT.

Mode of Hanging and Fastening Doors.

No. 9,533. Reissued Jan. 11, 1881.

WITNESSES:

W. W. Hollingsworth

Amos W. Stark

INVENTOR:

Chas. N. Earl

BY Munn & Co.

ATTORNEYS.

N. PETERS, PHOTO-LITHOGRAPHER, WASHINGTON, D. C.

UNITED STATES PATENT OFFICE.

CHARLES N. EARL, OF ELK RIVER, MINNESOTA, ASSIGNOR TO WILLIAM SAMSON AND ALBERT L. SWETT, OF MEDINA, NEW YORK.

MODE OF HANGING AND FASTENING DOORS.

SPECIFICATION forming part of Reissued Letters Patent No. 9,533, dated January 11, 1881.

Original No. 88,857, dated April 13, 1869. Application for reissue filed October 19, 1880.

*To all whom it may concern:*

Be it known that I, CHARLES N. EARL, of Elk River, in the county of Sherburne and State of Minnesota, have invented a new and Improved Mode of Hanging and Fastening Doors; and I do hereby declare that the following is a full, clear, and exact description of the same.

My invention is an improvement in the class of doors which are adapted to slide horizontally and are supported by hangers having rollers that run on a supporting-rail attached to the side of the building or other structure of which such door forms a part.

My invention relates more particularly to the combination of a sliding door, a supporting top guide-rail, having a rabbet in its under side, and hangers provided with rollers that run on the rail, as hereinafter fully described.

It also relates to a mechanism for facilitating opening and closing the door and securing it closed, as hereinafter described.

Figure 2:
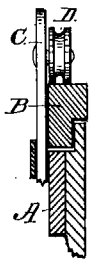
Figure 1:
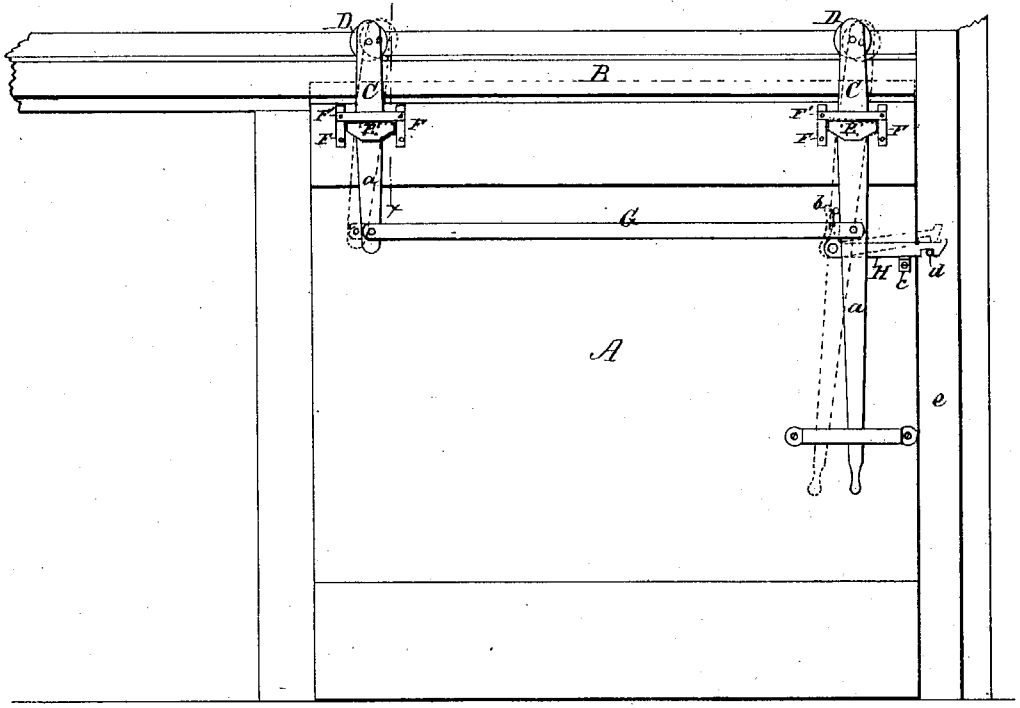

In accompanying drawings, forming part of this specification, Figure 1 is a front view, showing a door and other parts constructed and combined according to my invention. Fig. 2 is a cross-section on line *x x*, Fig. 1.

Referring to said figures, the horizontally-sliding door A may have the usual construction. The top rail, B, attached to the side of a building or other structure, has a lengthwise rabbet in its under side to receive a projecting portion of the door, so that the rail serves to prevent lateral displacement of the door at the top and to guide it in its sliding movement. The door is also supported by the rail, through the medium of the hangers C and rollers D journaled on said hangers—that is to say, the hangers C are secured to the side of the door A, and the rollers D run on the rail B.

In order to obviate the difficulty of sliding a door which rests upon a shoe on the floor, or runs in a groove, or rests on rollers running on a rail laid on the floor, and to better exclude wind and rain or snow when the door is shut, I employ a lever-and-catch mechanism, as shown in the drawings—that is to say, the hangers are extended downward to an unusual length, and each provided with a short cross-piece, E.

Cleats F F are attached to the door and connected by a cross-bar, F′. The space between the latter and the side of the door is sufficient to allow the levers C to be inserted; and when the parts are arranged as shown in full lines, Fig. 1, the cross-pieces E are below, but in contact, or nearly so, with the cross-bars F′.

The extensions or lower portions, *a*, of the lever-hangers are connected by a rod, G. Hence, if the longer or handle arm of that one of the hangers which is adjacent to the front edge of the door A be moved in either direction parallel to the door the other hanger will obviously be thrown into like oblique position, so that one corner of each of the cross-pieces will be caused to press upward against the cross-bars F′; and since the rollers D constitute practically fixed fulcra of said levers the door will be raised slightly, so as to slide easily.

In connection with the lever mechanism, I employ the catch H, which is pivoted to the door A behind the first lever, and is provided with a lug or projection, *b*, with which the lever comes in contact, so as to raise the catch and allow the door to be slid back. The free end of the catch rests on a stud, *c*, when the door is being opened or shut, and is thus held in the position required to adapt it to engage with a stud, *d*, fixed in the jamb *e*.

What I claim as new is—

1. The combination of a horizontally sliding door, a horizontal top guide-rail therefor, having a lengthwise rabbet in the under side for the purpose specified, and hangers attached to the door and having rollers that run on said rail, substantially as specified, whereby the door is held in place, guided, and supported, as set forth.

2. The combination, with the sliding door and a supporting top rail, of lever-hangers—that is to say, levers having rollers journaled on their upper ends, their lower portions being connected by a rod—the cross-pieces or ears E, and cross-bars F′, attached to the door, substantially as shown and described, whereby the adjustment of the levers will raise the door and facilitate its sliding movement, as hereinbefore specified.

3. The lever-hangers, connected as specified, in combination with the sliding door and top supporting-rail and the catch H, pivoted to said door, as shown and described, to operate as specified.

4. The arrangement upon a sliding door of two or more levers with rollers, latch, and connections, all operating in such a manner that the door is unlatched, raised, and slid back by the same movement of the longer lever, substantially as set forth.

CHARLES N. EARL.

Witnesses:
J. E. GRIFFIN,
H. MORRIS.